(12) United States Patent
Shin et al.

(10) Patent No.: US 12,003,119 B2
(45) Date of Patent: Jun. 4, 2024

(54) ELECTRONIC DEVICE AND METHOD FOR TRANSMITTING POWER BASED ON MULTIPLE COILS

(71) Applicant: Samsung Electronics Co., Ltd., Gyeonggi-do (KR)

(72) Inventors: Seungshik Shin, Gyeonggi-do (KR); Baewon Park, Gyeonggi-do (KR); Sungchul Park, Gyeonggi-do (KR); Jinsik Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 17/742,554

(22) Filed: May 12, 2022

(65) Prior Publication Data
US 2022/0368170 A1  Nov. 17, 2022

Related U.S. Application Data

(63) Continuation of application No. PCT/KR2022/006738, filed on May 11, 2022.

(30) Foreign Application Priority Data

May 12, 2021 (KR) .......................... 10-2021-0061499

(51) Int. Cl.
*H02J 50/40* (2016.01)
*H02J 7/00* (2006.01)
(Continued)

(52) U.S. Cl.
CPC .......... *H02J 50/70* (2016.02); *H02J 7/00712* (2020.01); *H02J 7/007188* (2020.01);
(Continued)

(58) Field of Classification Search
CPC .. H02J 50/70; H02J 7/00712; H02J 7/007188; H02J 50/10; H02J 50/402; H02J 50/80; H02J 50/90
See application file for complete search history.

(56) References Cited

U.S. PATENT DOCUMENTS

| 2016/0141882 A1 | 5/2016 | Ichikawa |
| 2017/0237292 A1 | 8/2017 | Jeong et al. |

(Continued)

FOREIGN PATENT DOCUMENTS

| CN | 107612105 A | 1/2018 |
| KR | 10-2014-0070705 A | 6/2014 |

(Continued)

OTHER PUBLICATIONS

International Search Report dated Aug. 17, 2022.

*Primary Examiner* — Daniel Cavallari
(74) *Attorney, Agent, or Firm* — Cha & Reiter, LLC

(57) ABSTRACT

According to various embodiments, an electronic device may comprise a battery, a multi-coil circuit including a first coil and a second coil, a magnetic field control circuit electrically connected with the multi-coil circuit, a power management module electrically connected with the battery and the magnetic field control circuit, and a processor electrically connected with the multi-coil circuit, the magnetic field control circuit, and the power management module. Upon detecting an external electronic device to receive wireless power, the processor may control the magnetic field control circuit to transmit power having a first characteristic to the external electronic device through the first coil, and upon transmitting the power having the first characteristic, control the magnetic field control circuit to maintain transmission through the first coil based on a first operating frequency and a threshold operating frequency in a designated frequency range, or upon transmitting the power (Continued)

having the first characteristic, adjust an operating voltage based on the first operating frequency and the threshold operating frequency and control the magnetic field control circuit to transmit power having a second characteristic through the first coil and the second coil based on a first frequency varied in response to the adjusted operating voltage. Other embodiments may also be possible.

10 Claims, 9 Drawing Sheets

(51) Int. Cl.
      *H02J 50/10*       (2016.01)
      *H02J 50/70*       (2016.01)
      *H02J 50/80*       (2016.01)
      *H02J 50/90*       (2016.01)

(52) U.S. Cl.
      CPC ............ *H02J 50/10* (2016.02); *H02J 50/402* (2020.01); *H02J 50/80* (2016.02); *H02J 50/90* (2016.02)

(56) References Cited

U.S. PATENT DOCUMENTS

| | | |
|---|---|---|
| 2018/0015833 A1 | 1/2018 | Namou et al. |
| 2018/0159371 A1 | 6/2018 | Kim et al. |
| 2019/0386519 A1 | 12/2019 | Chen |
| 2020/0227945 A1 | 7/2020 | Hemphill et al. |
| 2020/0274396 A1 | 8/2020 | Smith |
| 2020/0412175 A1 | 12/2020 | Han et al. |
| 2021/0143683 A1 | 5/2021 | Ha et al. |
| 2022/0006328 A1* | 1/2022 | Bae .................. H02J 50/12 |

FOREIGN PATENT DOCUMENTS

| | | |
|---|---|---|
| KR | 10-2018-0064238 A | 6/2018 |
| KR | 10-2019-0070011 A | 6/2019 |
| KR | 10-2019-0084388 A | 7/2019 |
| KR | 10-2020-0004132 A | 1/2020 |
| KR | 10-2137037 B1 | 7/2020 |
| WO | 2014/203346 A1 | 12/2014 |

\* cited by examiner

ELECTRONIC DEVICE AND METHOD FOR TRANSMITTING POWER BASED ON MULTIPLE COILS

CROSS-REFERENCE TO RELATED APPLICATIONS

This application is a continuation of International Application No. PCT/KR2022/006738 designating the United States, filed on May 11, 2022, in the Korean Intellectual Property Receiving Office and claiming priority to Korean Patent Application No. 10-2021-0061499, filed on May 12, 2021, in the Korean Intellectual Property Office, the disclosures of which are incorporated by reference herein in their entireties.

TECHNICAL FIELD

Certain embodiments relate to an electronic device and a multi-coil-based power transmission method in the electronic device.

BACKGROUND

Wireless power transfer is technology that converts electrical energy into electromagnetic waves having a frequency and wirelessly transfers energy to a load without a transmission line. Wireless power transfer may be technology to wirelessly transfer power from a power transmission device to a power reception device without wired connection and charging the battery of the power reception device. Wireless power transfer may include a magnetic induction scheme, a magnetic resonance scheme, or other various wireless power transfer schemes.

The magnetic induction scheme transfers power using the magnetic field induced in a coil. The magnetic induction scheme supply energy to the load by flowing an induced current through a reception coil using the magnetic field generated from the current flowing through a transmission coil. Upon wireless power transmission through coils between an electronic device (e.g., a wireless power transmission device) and an external electronic device (e.g., a wireless power reception device), the size of the coil (e.g., transmission coil) of the electronic device may differ from the size of the coil (e.g., reception coil) of the external electronic device. A difference in size between the coil of the electronic device and the coil of the external electronic device may affect the power transmission efficiency upon power transmission between the electronic device and the external electronic device and increase leakage H-field. In other words, the difference in size between the coil of the electronic device and the coil of the external electronic device upon wireless power transmission through the coils between the electronic device and the external electronic device may reduce the coupling coefficient (e.g., the coefficient of crossing magnetic lines of force), and the reduced coupling coefficient may degrade efficiency and increase heat and power consumption.

SUMMARY

According to certain embodiments, an electronic device may comprise a battery, a multi-coil circuit including a first coil and a second coil, a magnetic field control circuit electrically connected with the multi-coil circuit, a power management module electrically connected with the battery and the magnetic field control circuit, and a processor electrically connected with the multi-coil circuit, the magnetic field control circuit, and the power management module. Upon detecting an external electronic device to receive wireless power, the processor may control the magnetic field control circuit to transmit power having a first characteristic to the external electronic device through the first coil, and upon transmitting the power having the first characteristic, control the magnetic field control circuit to maintain transmission through the first coil based on a first operating frequency and a threshold operating frequency in a designated frequency range, or upon transmitting the power having the first characteristic, adjust an operating voltage based on the first operating frequency and the threshold operating frequency and control the magnetic field control circuit to transmit power having a second characteristic through the first coil and the second coil based on a first frequency varied in response to the adjusted operating voltage.

According to certain embodiments, a method for transmitting wireless power based on multiple coils in an electronic device may comprise, upon detecting an external electronic device to receive wireless power, transmitting power having a first characteristic to the external electronic device through a first coil by using a magnetic field control circuit, and upon transmitting the power having the first characteristic, maintaining transmission through the first coil based on a first operating frequency and a threshold operating frequency in a designated frequency range, or adjusting an operating voltage based on the first operating frequency and the threshold operating frequency and transmitting power having a second characteristic through the first coil and the second coil by using the magnetic field control circuit based on a first frequency varied in response to the adjusted operating voltage.

According to certain embodiments, there may be provided a non-transitory storage medium storing instructions configured to be executed by at least one processor of an electronic device to enable the electronic device to perform at least one operation. The at least one operation may comprise, upon detecting an external electronic device to receive wireless power, transmitting first power having a first characteristic to the external electronic device through a first coil by using a magnetic field control circuit, and upon transmitting the power having the first characteristic, selectively maintaining transmission through the first coil based on a first operating frequency and a threshold operating frequency in a designated frequency range, or adjusting an operating voltage based on the first operating frequency and the threshold operating frequency and transmitting power having a second characteristic through the first coil and the second coil by using the magnetic field control circuit based on a first frequency varied in response to the adjusted operating voltage.

BRIEF DESCRIPTION

Figure 10:
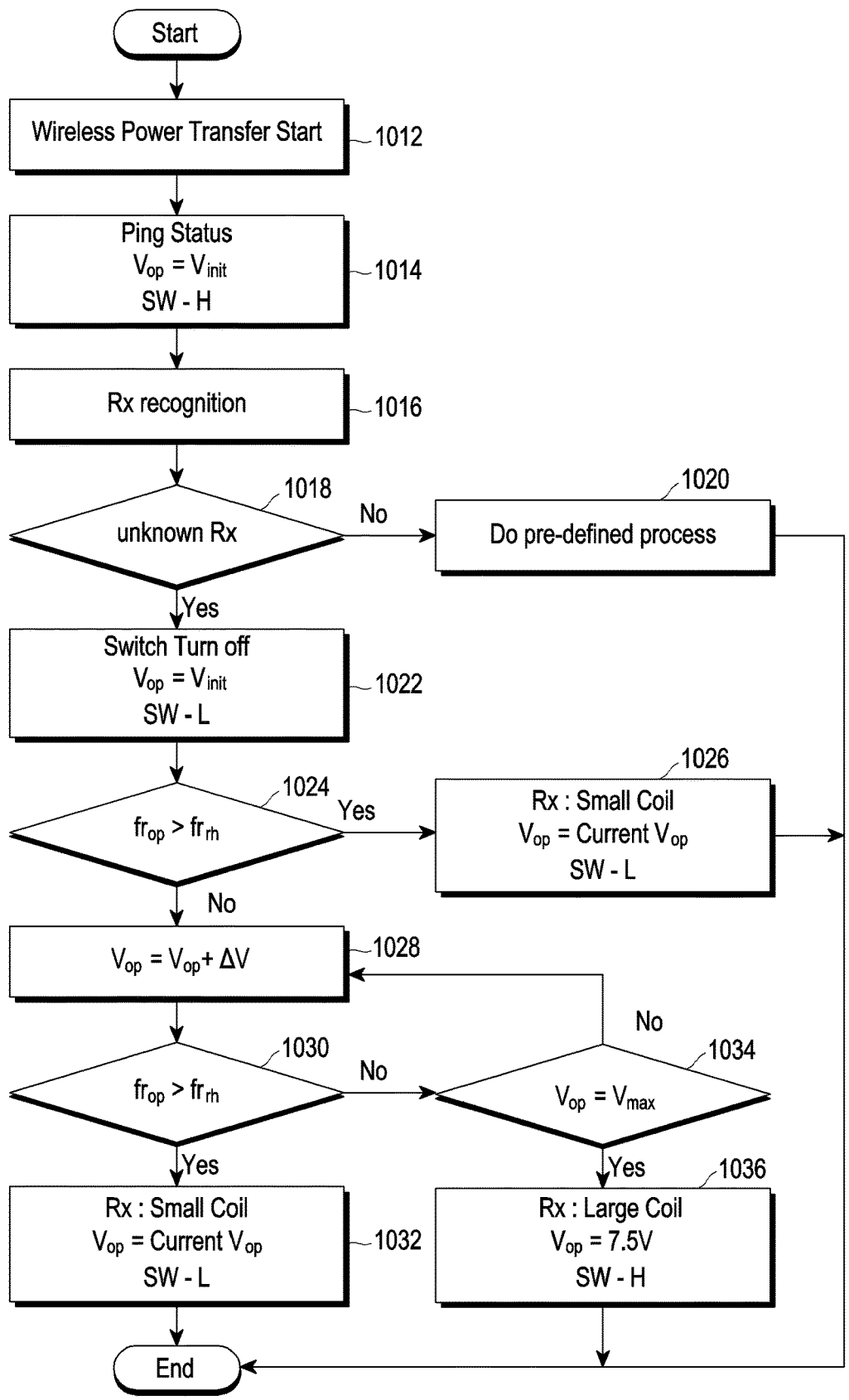
Figure 11:
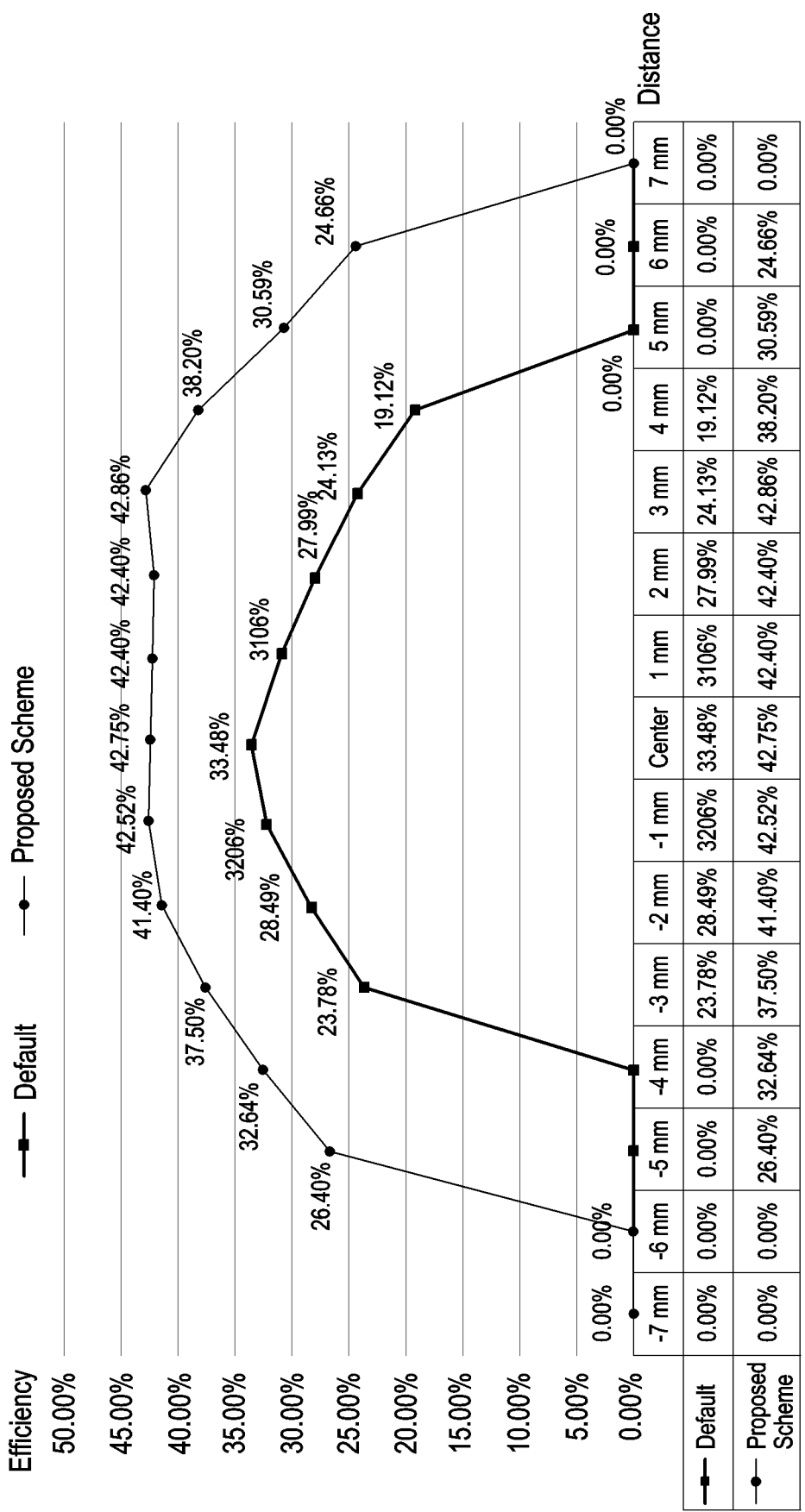

FIG. 10 is a flowchart illustrating a multi-coil-based power transmission method depending on the presence or absence of external electronic device information in an electronic device according to an embodiment; and FIG. 11 is a view illustrating an example of enhancing power transmission efficiency when wireless power is transmitted from an electronic device to an external electronic device according to an embodiment.

The same or similar reference denotations may be used to refer to the same or similar elements throughout the specification and the drawings.

DETAILED DESCRIPTION

According to certain embodiments, there is provided a method in which an electronic device increases power transmission efficiency upon wireless power transmission and prevents an increase in leakage H-field.

According to certain embodiments, in an electronic device having multiple coils, a coil with a small difference in size from a coil of an external electronic device is identified among the coils, and it is possible to reduce leakage H-fields while increasing transmission efficiency by using the identified coil in wireless power transmission.

According to certain embodiments, there may be provided an electronic device and a multi-coil-based power transmission method in the electronic device, which may increase transmission efficiency and reduce leakage H-field by using a coil, having a small difference in size from a coil of an external electronic device, among multiple coils included in the electronic device, in wirelessly transmitting power.

According to certain embodiments, there may be provided an electronic device and a multi-coil-based power transmission method in the electronic device, which may identify a coil, having high power transmission efficiency and small leakage H-field, among multiple coils included in the electronic device, based on an operating frequency and an operating voltage when the electronic device transmits wireless power to a coil of an external electronic device and use the identified coil in wirelessly transmitting power.

Effects of the disclosure are not limited to the foregoing, and other unmentioned effects would be apparent to one of ordinary skill in the art from the following description.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Figure 1:
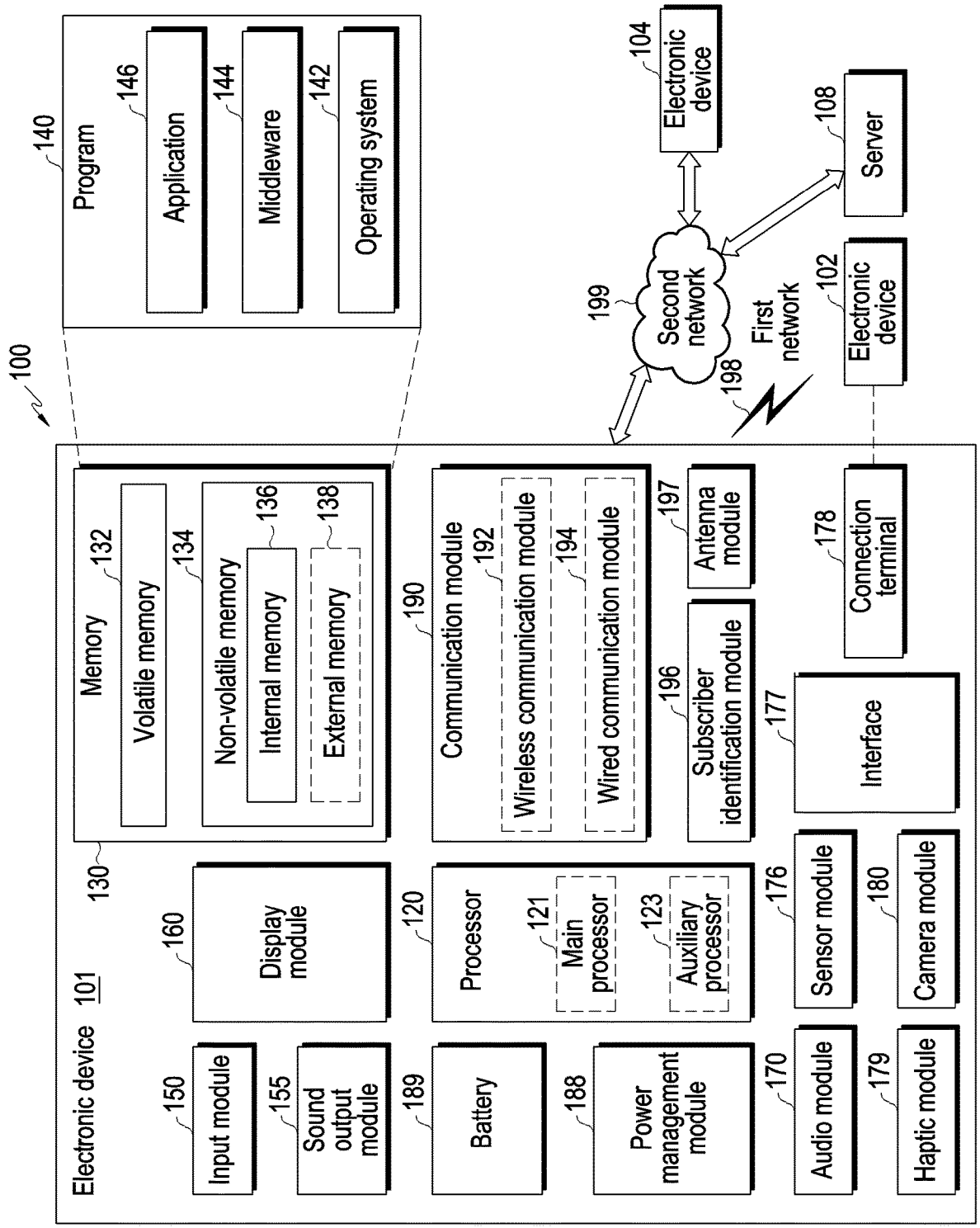
FIG. 1 is a block diagram illustrating an electronic device in a network environment according to an embodiment.

FIG. 1 describes an electronic device that can act as a wireless power transmission device or a wireless power reception device. For example, electronic device 101 includes a number of electronic components that are powered by electricity from a battery 189. The battery 189 stores only a limited amount of power. When the power from the battery 189 is depleted, the user can recharge the battery 189, either by connecting the battery 189 to a power source. Alternatively, the user can wirelessly recharge the battery 189 by placing the electronic device 101 in the proximity of an external electronic device that acts as a wireless power transmission device, e.g., external electronic device 102. Alternatively, the electronic device 101 can act as a power transmission device and transmit power to external electronic device 102, acting as a wireless power reception device. For the purposes of discussion, the electronic device 101 shall be considered the wireless power transmission device and external electronic device 102 will be considered the wireless power reception device with the understanding that the opposite may also be true.

The electronic device 101 includes multiple coils. Electronic device 101 selects a coil among the multiple coils that is closest in size to a coil at external electronic device 102. Accordingly, leakage H-field and degradation of the coupling coefficient can be prevented.

Electronic Device

FIG. 1 is a block diagram illustrating an electronic device 101 in a network environment 100 according to certain embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment, the external electronic device 104 may include an internet-of-things (IoT) device.

The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

As noted above, electronic device 101 can transmit or receive power to/from external electronic device 102 by transmitting/receiving an electromagnetic field. The electronic device 101 includes multiple coils can transmit/receive wireless power by using only one coil, or two or more coils connected in parallel.

Figure 2:
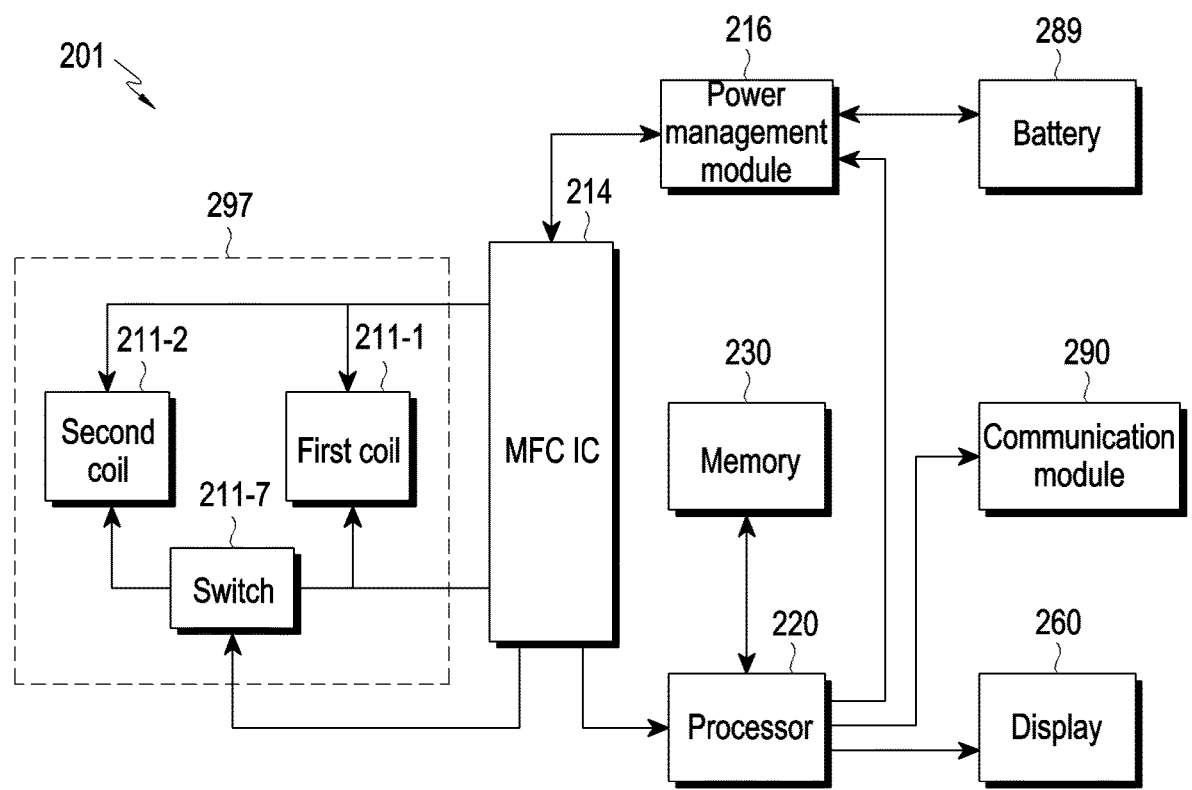
FIG. 2 is a block diagram illustrating an electronic device including a multi-coil circuit according to an embodiment.

FIG. 2 is a block diagram illustrating an electronic device including a multi-coil circuit according to an embodiment. The electronic device 201 can include a first coil 211-1 and a second coil 211-2. Based on the state of a switch 211-7, a magnetic field controller integrated circuit (MFC-IC) 214 may be connected to and control the first coil 211-1 or the first coil 211-1 and the second coil 211-2 in parallel.

A processor 220 may control the switch 211-7 to switch on, thereby connecting the first coil 211-1 and the second coil 211-2 in parallel. The first coil 211-1 and the second coil 211-2 in parallel may output a ping signal. An external device can be detected by detecting of a response to the ping signal. The response to the ping signal can include information that the processor uses to determine whether to use the first coil 211-1 or the first coil 211-1 and the second coil 211-2 in parallel to transmit/receive power. The information can include information for determining operating frequency and voltage range.

Referring to FIG. 2, according to an embodiment, an electronic device 201 (or a wireless power transmission device) (e.g., the electronic device 101 of FIG. 1) may include all or some of a multi-coil circuit 297 (e.g., the antenna module 197 of FIG. 1), a magnetic field control circuit (magnetic field controller integrated circuit (MFC IC)) 214, a power management module (power management integrated circuit (PMIC chip)) 216, a processor 220 (e.g., the processor 120 of FIG. 1), a memory 230 (e.g., the memory 130 of FIG. 1), a battery 289 (e.g., the battery 189 of FIG. 1), a communication module 290 (e.g., the communication module 190 of FIG. 1), and a display 260 (e.g., the display module 160 of FIG. 1).

The multi-coil circuit 297 may include a first coil 211-1, a second coil 211-2, and a switch 211-7 as a parallel dual coil. The multi-coil circuit 297 may further include additional coil(s) in addition to the first coil 211-1 and the second coil 211-2. The multi-coil circuit 297 may be an integrated package of the first coil 211-1, the second coil 211-2, additional coil(s), if any, and the switch 211-7.

The first coil 211-1 and the second coil 211-2 may be coils for wireless power transmission/reception (e.g., near field magnetic induction (NFMI)). The first coil 211-1 may be included inside (Coil_IN) the multi-coil circuit 297, and the second coil 211-2 may be included outside (Coil_OUT) the first coil 211-1. The first coil 211-1 and the second coil 211-2 may have a length (or number of turns) used to wirelessly transmit power. The first coil 211-1 may have a length (or number of turns) used to wirelessly transmit power having a first characteristic using the first coil 211-1. The first coil 211-1 and the second coil 211-2 may have a length (or number of turns) used to wirelessly transmit power having a second characteristic using the first coil 211-1 and the second coil 211-2 connected in parallel with each other. The switch 211-7 may have an end connected with the first coil 211-1 and the MFC IC 214 and another end connected with the second coil 211-2. The first switch 211-7 may perform a switch on/off operation under the control of the processor 220 (e.g., the processor 120 of FIG. 1). When the switch 211-7 is switched on, the first coil 211-1 and the second coil 211-2 may be connected in parallel, and together may be connected to the MFC IC 214. When the switch 211-7 is switched off, the first coil 211-1 and the second coil 211-2 are not connected, and the first coil 211-1, but not the second coil 211-2, may be connected with the MFC IC 214. The MFC IC 214 can be connected to the operatively connected to the first coil 211-1 and selectively operatively connected to the second coil 211-2. By way of example, and not limitation, operatively connected with the MFC IC 214 can be understood to mean connected to form a complete circuit. For example, when switch 211-7 is off (open circuit), the second coil 211-2 is not operatively connected with the MFC IC 214.

The MFC IC 214 may be connected with the first coil 211-1 or connected with the first coil 211-1 and the second coil 211-2, which are connected in parallel, based on the switch-on or switch-off operation of the switch 211-7. The MFC IC 214 may perform a wireless power reception operation or wireless power transmission operation using the first coil 211-1 and a second coil 211-2 connected in parallel, of the multi-coil circuit 297. The switch-on operation of switch 211-7 shall be understood to mean that that the switch 211-7 forms a short circuit and the switch-off operation of switch 211-7 shall be understood to mean that the switch 211-7 forms an open circuit.

The MFC IC 214 may include a wireless power reception circuit (not shown) for wireless power reception and a wireless power transmission circuit (not shown) for wireless power transmission. For example, upon receiving wireless power, the wireless power reception circuit may perform power processing, such as rectifying the alternating current (AC) waveform of power received through the first coil 211-1 or the first coil 211-1 and the second coil 211-2 connected in parallel into a DC waveform, converting the voltage, or regulating the power and transfer the same to the power management module 216. For example, upon transmitting wireless power, the wireless power transmission circuit may receive power from the power management module 216, generate an AC waveform for power transmission, and transmits wireless power a magnetic field generated through the first coil 211-1 or the first coil 211-1 and the second coil 211-2 based on the AC waveform.

Upon wireless power transmission, the MFC IC 214 may perform operating frequency adjustment and duty control based on a power control packet (e.g., control error packet (CEP)). The power control packet can be received from an external electronic device (e.g., wireless power reception device). The MFC IC 214 may transfer data indicating the operating frequency to the processor 220 at designated time intervals or regularly during wireless power transmission. The MFC IC 214 may transfer a switch-on or switch-off control signal to the switch 211-7, in a designated scheme (e.g., a general-purpose input/output (GPIO) scheme), based on the switch-on or switch-off control of the processor 220.

The power management module 216 may be connected between the MFC IC 214 and the battery 289. The power management module 216 may charge the battery 289 with the power received using the multi-coil circuit 212 and the MFC IC 214 and output the power from the battery 289 to the outside through the MFC IC 214 and the multi-coil circuit 212. For example, the MFC IC 214 may allow a magnetic field to be formed at the first coil 211-1 or the first coil 211-1 and the second coil circuit 297 of the multi-coil circuit 297 using the power received through the power management module 216, so that the power is wirelessly transmitted to the external electronic device. For example, it is possible to allow the power from the battery 989 to be wirelessly shared with the external electronic device. The external electronic device may be one of various types of external electronic devices. For example, various types of external electronic devices may include an accessory device (e.g., a smart watch, a wireless headset, or a wireless earphone) capable of interworking with the electronic device 201 (e.g., a smartphone).

The processor 220 may perform a wireless power transmission or reception control operation. the processor 220 may receive information indicating an operating frequency (or resonant frequency) through the MFC IC 214 during wireless power transmission. Based thereon, the processor may request the power management module 216 adjust the operating voltage. The processor 220 may control (or adjust) the operating frequency to be included in a designated frequency range (e.g., 100 kHz to 196 kHz, or 110 kHz to 148 kHz) or control (or adjust) the operating voltage in a designated voltage range (e.g., 5 v to 9 v) to thereby control (or adjust) the strength of transmission power. For example, the processor 220 may increase the strength of transmission power by decreasing the operating frequency within the designated frequency range and may decrease the strength of transmission power by increasing the operating frequency within the designated frequency range. For another example, the processor 220 may increase the strength of transmission power by increasing the operating voltage within the designated voltage range at the same operating frequency and may decrease the strength of transmission power by decreasing the operating voltage within the designated voltage range at the same operating frequency.

The processor 220 may perform a ping (ping phase) operation, an authentication (identification & configuration) operation, and/or a power transmission (power transfer phase) operation to provide power for wireless power transmission. For example, the ping operation may be an operation for outputting a ping signal and detecting an external electronic device to receive wireless power based on the ping signal. The authentication operation may be an operation for receiving identification information and/or authentication information from the detected external electronic device and identify and/or authenticate the external electronic device. The power transmission operation may be an operation for wirelessly transmitting power to the identified and/or authenticated external electronic device.

The processor 220 may periodically output a ping signal during the ping operation based on a power transmission request. The processor 220 may sense or detect an external electronic device based on detection of a response (e.g., signal strength packet (SSP)) corresponding to the ping signal from the external electronic device (e.g., the electronic device 102 of FIG. 1). During the ping operation, the processor 220 may control the switch 211-7 to switch on and output a ping signal through the first coil 211-1 and second coil 211-2, connected in parallel, and, based on the detection of a response corresponding to the ping signal is detected, sense or detect the external electronic device.

The processor 220 may perform the authentication operation when the external electronic device is detected. The processor 220 may receive information necessary for receiving power by the external electronic device and information for identifying the external electronic device in the authentication operation. For example, the information for identifying the external electronic device may include the ID of the external electronic device and/or information indicating a size of a coil (or reception coil) of the external electronic device. The processor 220 may store the external electronic device ID and the information indicating the size of the coil in the memory and obtain the information indicating the size of the coil about the external electronic device from the memory using the external electronic device ID. Alternatively, the processor 220 may obtain the information indicating the size of the coil about the external electronic device from an external server using the external electronic device ID.

When the information indicating the size of the coil of the external electronic device is obtained, the processor 220 may identify whether to use the first coil 211-1 or the first coil 211-1 and second coil 211-2, connected in parallel, for wireless power transmission, using the information indicating the size of the coil of the external electronic device. For example, when the first coil 211-1 is used, the processor 220 may control the switch 211-7 to switch off and, when the first coil 211-1 and second coil 211-2, connected in parallel, are used, control the switch 211-7 to switch on.

When the information indicating the size of the coil of the external electronic device is not obtained (or when it is impossible to obtain the information indicating the size of the coil of the external electronic device), the processor 220 may perform an operation for selecting a transmission coil of the electronic device (or identifying the coil size of the external electronic device). The processor 220 may perform an operation for selecting a transmission coil of the electronic device (or identifying the coil size of the external electronic device) regardless of whether the information indicating the size of the coil of the external electronic device is obtained.

During the operation for selecting a transmission coil of the electronic device (or identifying the coil size of the external electronic device), the processor 220 may identify whether the operating frequency (e.g., a first operating frequency) is a threshold operating frequency frth within a designated frequency range while transmitting power (e.g., power having a first characteristic) through the first coil 211-1 in a state in which the switch 211-7 is switched off. When the first operating frequency is equal to or larger than the threshold operating frequency frth within the designated frequency range, the processor 220 may identify that the size of the coil of the external electronic device is not larger than the first coil 211-1 by a designated size (similar to the size of the first coil 211-1 or smaller by the designated size or less), maintain the switch-off state, and transmit the power having the first characteristic through the first coil 211-1. According to an embodiment, if the first operating frequency is not more than (or less than) the threshold operating frequency frth within the designated frequency range, the processor 220 may adjust (increase voltage) the operating voltage up to the maximum voltage (e.g., 9 v) in the designated voltage range (e.g., 5 v to 9 v), identify the varied first operating frequency, and identify whether the varied first operating frequency is higher than the threshold operating frequency frth. For example, if the operating voltage increases, the strength of transmission power may increase and, if the first operating frequency is higher than the threshold operating frequency frth in a state in which the strength of transmission power is large, a designated transmission efficiency may be met. For example, if the operating voltage increases, the strength of transmission power may increase and, if the first operating frequency is lower than the threshold operating frequency frth in a state in which the strength of transmission power is large, the designated transmission efficiency may not be met.

When the varied first operating frequency is higher than the threshold operating frequency frth, the processor 220 may maintain the switch-off state and transmit the power having the first characteristic through the first coil 211-1 When the varied first operating frequency is not higher than the threshold operating frequency frth, the processor 220 may identify that the size of the coil of the external electronic device is larger than the first coil 211-1 by a designated size (e.g., larger than the first coil 211-1, or a coil with the designated size or more, or a normal coil), control the switch 211-7 to switch on and transmit power having the second characteristic through the first coil 211-1 and the second coil 211-2.

The memory 230 (e.g., the memory 130 of FIG. 1) may store various control data used by at least one component (e.g., the processor 220 or the MFC IC 214) of the electronic device 201. The memory 230 may store instructions to perform the operation of the processor 220 of the electronic device 201. The memory 230 may be implemented in various forms, such as read only memory (ROM), random access memory (RAM), or flash memory, and is not limited to a specific implementation.

The communication module 290 may communicate with an external electronic device and/or another external electronic device or server and may obtain external electronic device identification information or external electronic device coil size-associated information through communication.

The display 260 may display data or a screen required for a wireless power transmission operation. For example, the display 260 may display data or a screen for obtaining information indicating the size of the coil of the external electronic device.

The electronic device 201 may further include an input module (e.g., a touch input module, a key input module, or a user interface module) and may receive, from the user, information indicating the size of the coil of the external electronic device through the input module.

According to certain embodiments, an electronic device (e.g., the electronic device 101 of FIG. 1 or the electronic device 201 of FIG. 2) may comprise a battery (e.g., the battery 189 of FIG. 1 or the battery 289 of FIG. 2), a first coil (e.g., the first coil 211-1 of FIG. 2), a second coil (e.g., the second coil 211-2 of FIG. 2), a magnetic field control circuit (e.g., the magnetic field control circuit 214 of FIG. 2) electrically connected with the multi-coil circuit, a power management module (e.g., the power management module 188 of FIG. 1 or the power management module 216 of FIG. 2) electrically connected with the battery and the magnetic field control circuit, and a processor (e.g., the processor 120 of FIG. 1 or the processor 220 of FIG. 2) electrically connected with the multi-coil circuit, the magnetic field control circuit, and the power management module. Upon detecting an external electronic device to receive wireless power, the processor may control the magnetic field control circuit to transmit power having a first characteristic to the external electronic device through the first coil, transmitting the power having the first characteristic, control the magnetic field control circuit to selectively maintain transmission through the first coil based on a first operating frequency and a threshold operating frequency in a designated frequency range, or upon transmitting the power having the first characteristic, adjust an operating voltage based on the first operating frequency and the threshold operating frequency and control the magnetic field control circuit to transmit power having a second characteristic through the first coil and the second coil based on a first frequency varied in response to the adjusted operating voltage.

According to certain embodiments, when the first operating frequency is greater than or equal to the threshold operating frequency upon transmitting the power having a first characteristic, the processor may control the magnetic field control circuit to maintain the transmission of the power having the first characteristic through the first coil. When the first operating frequency is less than the threshold operating frequency upon transmitting the power having the first characteristic, the processor may identify a variation in the first operating frequency while increasing the operating voltage to a maximum voltage in a designated operating voltage range. When the varied first operating frequency is greater than or equal to the threshold operating frequency, the processor may control the magnetic field control circuit to maintain the transmission of the power having the first characteristic through the first coil, and when the varied first operating frequency is less than the threshold operating frequency, the processor may control the magnetic field control circuit to transmit the power having the second characteristic through the first coil and the second coil connected in parallel.

According to certain embodiments, the first coil may be a circular coil, and the second coil may be a coil surrounding the first coil.

According to certain embodiments, a first end and a second end of the first coil may be connected with the magnetic field control circuit, and the first end of the first coil may be connected with a first end of the second coil. A second end of the second coil may be connected with a first end of the switch, and a second end of the switch may be connected with the second end of the first coil.

According to certain embodiments, the processor may control the switch to switch on to connect the first coil and the second coil in parallel connected with the magnetic field control circuit, or control the switch to switch off to form an open circuit between the second end of the first coil and the second end of the second coil.

According to certain embodiments, the electronic device may further comprise a communication module (e.g., the communication module 190 of FIG. 1 or the communication module 290 of FIG. 2). The processor may obtain information indicating a size of a coil of the external electronic device through the communication module and control the magnetic field control circuit to transmit the power having the first characteristic through the first coil or transmit the power having the second characteristic through the first coil and the second coil, based at least in part on the information indicating the size of the coil of the external electronic device.

According to certain embodiments, the designated frequency range may be 100 kHz to 196 kHz or 110 kHz to 148 kHz.

According to certain embodiments, the designated operating voltage range may be 5V to 9V.

According to certain embodiments, the processor may be configured to output a ping signal through the first coil and the second coil and identify external electronic device based on a response to the ping signal.

Figure 3:
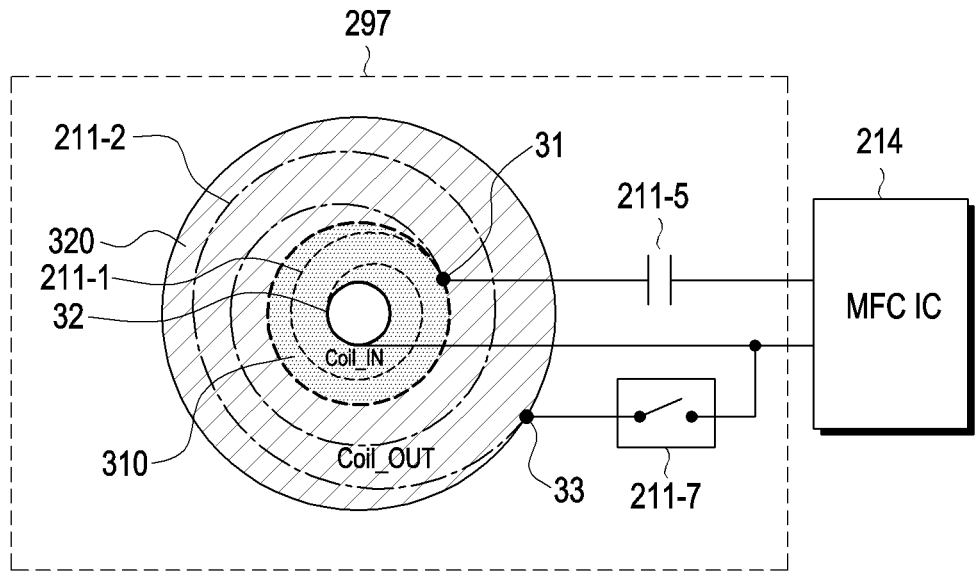
FIG. 3 is a concept view illustrating a multi-coil circuit according to an embodiment.

FIG. 3 is a concept view illustrating a multi-coil circuit according to an embodiment. Referring to FIG. 3, according to an embodiment, in a multi-coil circuit 297, a first coil 211-1 (e.g., the first coil 211-1 of FIG. 2) may be disposed in a Coil_IN area 310, and a second coil 211-2 (e.g., the second coil 211-2 of FIG. 2) may be disposed in a Coil_OUT area 320. For example, the first coil 211-1 may be a circular coil connected by a first end and a second end to the MFC IC 214, and the second coil 211-2 may be a coil surrounding the first coil 211-1. A first end of the second coil 211-2 and the first end of the first coil 211-1 are connected. The second end of the second coil 211-2 and the second end of the first coil 211-1 are connected each connected to a switch 211-7, which selectively shorts or forms an open circuit, therebetween. The Coil_IN area 310 and the Coil_OUT area 320 of the multi-coil circuit 297 may overlap. According to an embodiment, the multi-coil circuit 297 may be branched into the first coil 211-1 and the second coil 211-2 at a first point 31 which is a boundary point (e.g., the outer diameter of the first coil 211-1 or the inner diameter of the second coil 211-2) between the Coil_IN area 310 and the Coil_OUT area 320.

The first coil 211-1 may be wound to have a designated number of turns from the first point 31 to a second point 32 (e.g., the innermost point of the Coil_IN area 310) inside the Coil_IN area 310, and the second point 32 may be connected with the MFC IC 214. The second coil 211-2 may be wound to have a designated number of turns from the first point 31 to a third point 33 (e.g., the outermost point of the Coil_OUT area 320) outside the Coil_OUT area 320, and the third point 33 may be connected with the switch 211-7.

Figure 4A:
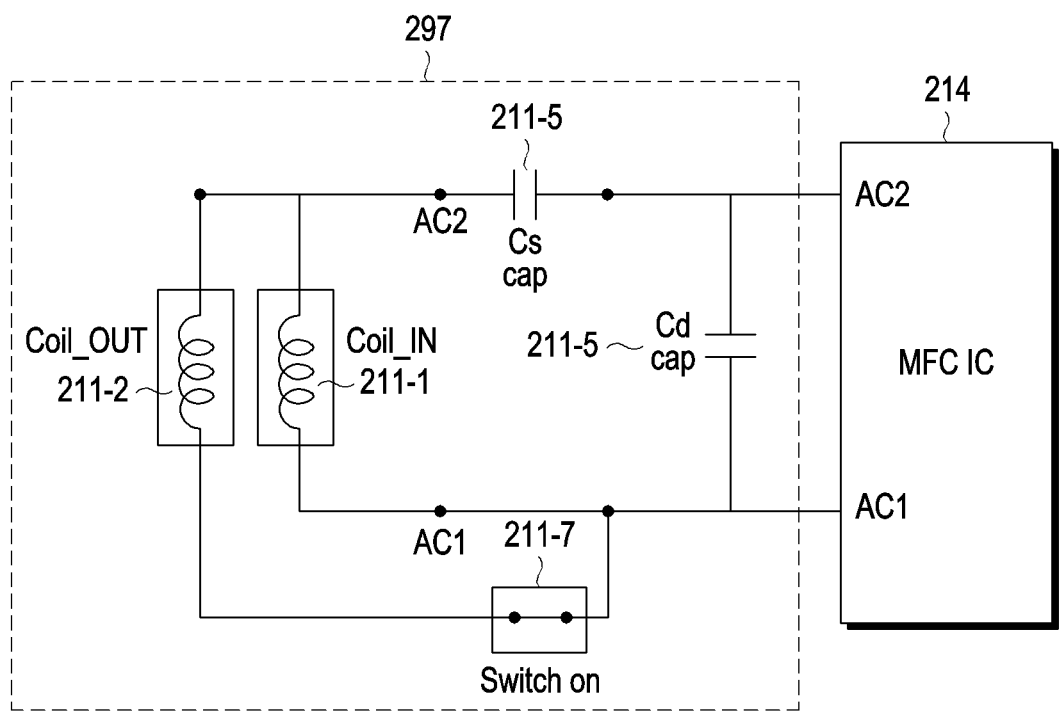
FIG. 4A is a view illustrating a case in which a switch of a multi-coil circuit is in a switch-on state according to an embodiment.
Figure 4B:
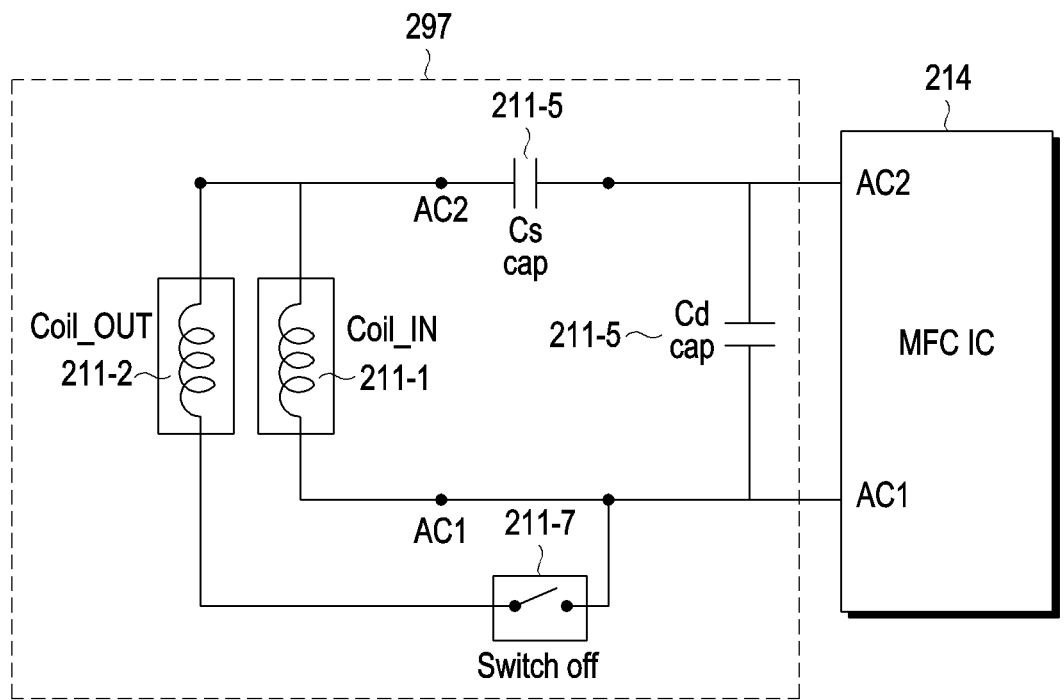
FIG. 4B is a view illustrating a case in which a switch of a multi-coil circuit is in a switch-off state.

FIG. 4A is a view illustrating a case in which a switch of a multi-coil circuit is in a switch-on state according to an embodiment, and FIG. 4B is a view illustrating a case in which a switch of a multi-coil circuit is in a switch-off state.

Referring to FIGS. 4A and 4B, according to an embodiment, the multi-coil circuit 297 may include a first coil 211-1, a second coil 211-2, a capacitance 211-5, and a switch 211-7. The first coil 211-1 and the second coil 211-2 may be coils for wireless power transmission/reception (e.g., NFMI). The first coil 211-1 is connected by a first end and a second end to the MFC IC 214. A first end of the second coil 211-2 and the first end of the first coil 211-1 are connected. The second end of the second coil 211-2 and the second end of the first coil 211-1 are connected each connected to a switch 211-7, which selectively shorts or forms an open circuit, therebetween.

The first coil 211-1 may be the inner coil Coil_IN, and the second coil 211-2 may be disposed as the outer coil Coil_OUT of the first coil 211-1.

Two opposite ends AC1 and AC2 of the first coil 211-1 may be connected with the MFC IC 214, and one end AC2 of the two opposite ends AC1 and AC2 of the first coil 211-1 may be connected with the second coil 211-2.

According to an embodiment, one end of the second coil 211-2 may be connected with the first coil 211-1, and the other end may be connected with the switch 211-7.

The capacitance (Cs cap, Cd cap) 211-5 may have a capacitance value required for the multi-coil circuit 297 to maintain a designated inductance and resistance when the power having the first characteristic is wirelessly transmitted to the external electronic device through the first coil 211-1 or when the power having the second characteristic is wirelessly transmitted to the external electronic device through the first coil 211-1 and second coil 211-2, connected in parallel.

According to an embodiment, one end of the switch 211-7 may be connected with the second coil 211-2, and the other end may be connected with the MFC IC 214. The switch 211-7 may perform a switch on/off operation according to the control of the processor (e.g., the processor 120 of FIG. 1 or the processor 220 of FIG. 2) or/and the MFC IC 214.

Referring to FIG. 4B, in the switch-off state of the switch 211-7, the first coil 211-1 may be connected to the MFC IC 214 to operate as a coil for wireless power transmission. Referring to FIG. 4A, in the switch-on state of the switch 211-7, the first coil 211-1 and the second coil 211-2 connected in parallel may be connected to the MFC IC 214 to operate as a coil for wireless power transmission.

Figure 5:
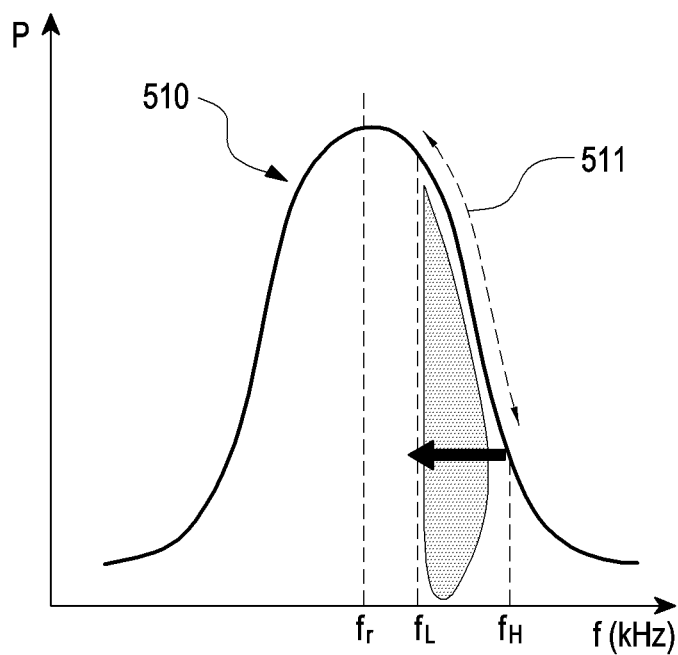
FIG. 5 is a graph illustrating a relationship between operating frequency and transmission power during wireless power transmission in an electronic device according to an embodiment.

FIG. 5 is a graph illustrating a relationship between operating frequency and transmission power during wireless power transmission in an electronic device according to an embodiment.

Referring to FIG. 5, according to an embodiment, when wireless power is transmitted from an electronic device (e.g., the electronic device 101 of FIG. 1 or the electronic device 201 of FIG. 2) to an external electronic device, the power P received by the external electronic device may be changed depending on the operating frequency f, as shown in the power gain curve 510. The processor (e.g., the processor 120 of FIG. 1 or the processor 220 of FIG. 2) of the electronic device may control to wirelessly transmit power in a designated frequency range (fLkHz to fHkHz) 511 (e.g., 100 kHz to 196 kHz or 110 kHz to 148 kHz). The strength of transmission power (or power transmission efficiency) may be the greatest at the lowest frequency (fLkHz) (e.g., 100 kHz or 110 kHz) within the designated frequency range 511. The processor 220 of the electronic device 201 may control the operating frequency to be a lower frequency in the designated frequency range 511 when wireless power is transmitted.

Figure 6:
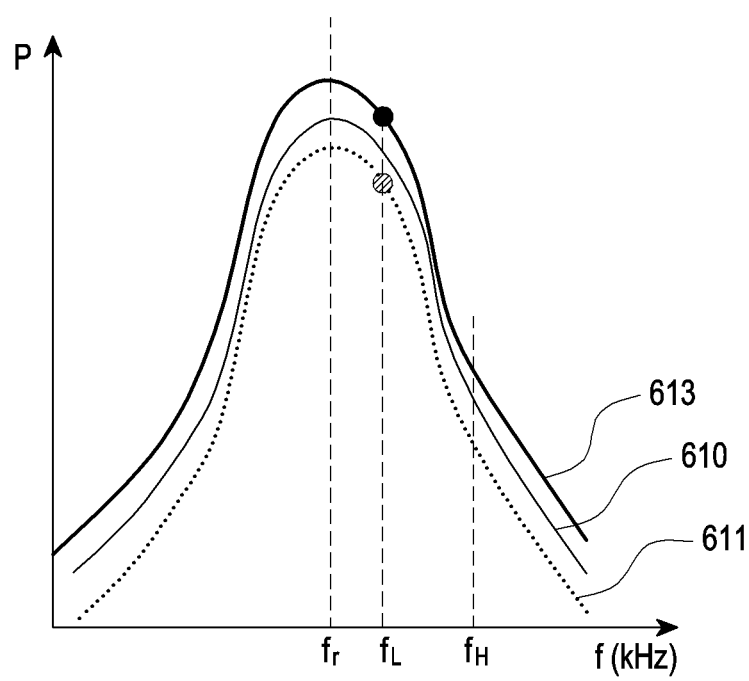
FIG. 6 is a graph illustrating a relationship between operating frequency, operating voltage, and transmission power in an electronic device according to an embodiment.

FIG. 6 is a graph illustrating a relationship between operating frequency, operating voltage, and transmission power in an electronic device according to an embodiment.

Referring to FIG. 6, according to an embodiment, when wireless power is transmitted from an electronic device (e.g., the electronic device 101 of FIG. 1 or the electronic device 201 of FIG. 2) to an external electronic device, the power P received by the external electronic device may be changed depending on changes in the operating voltage fop, as shown in a power having the first characteristic gain curve 610, a second power gain curve 611, and a third power gain curve 613. According to an embodiment, upon power transmission, the processor (e.g., the processor 120 of FIG. 1 or the processor 220 of FIG. 2) may control (or adjust) the operating voltage to increase power gain while transmitting power in a designated frequency range (flkHz to fHkHz) (e.g., 100 kHz to 196 kHz or 110 kHz to 148 kHz). The processor 220 may control (or adjust) the operating voltage within a designated voltage range (e.g., 5V to 9V) while transmitting power within the designated frequency range. For example, if the processor 220 reduces the operating voltage at a fixed operating frequency (fixed fop) without frequency adjustment in the state of the first power gain curve 610, the transmission power gain (or resonance gain) may be decreased as shown in the second power gain curve 611. In contrast, if the processor 220 increases the operating voltage without frequency adjustment in the state of the first power gain curve 610, the transmission power gain (or resonance gain) may be increased as shown in the second power gain curve 613.

Figure 7:
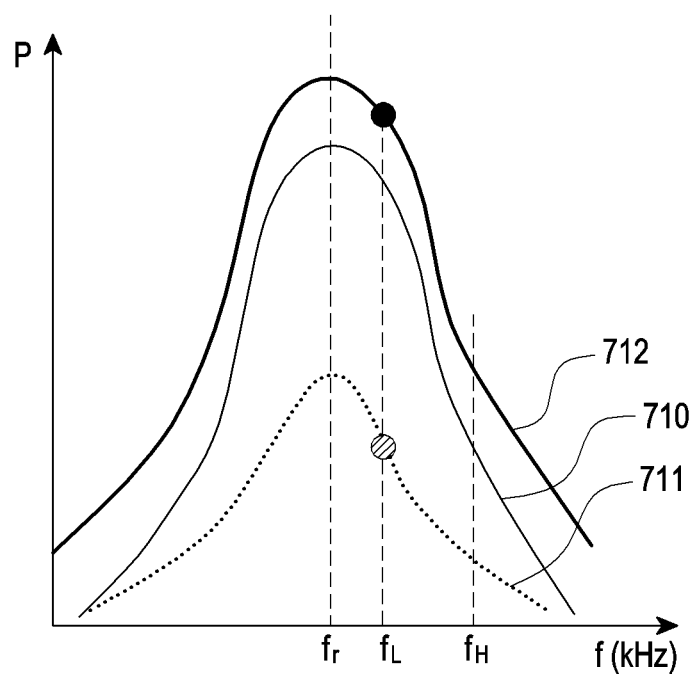
FIG. 7 is a graph illustrating an example of a change in transmission power for each operating frequency and operating voltage in an electronic device according to an embodiment.

FIG. 7 is a graph illustrating an example of a change in transmission power for each operating frequency and operating voltage in an electronic device according to an embodiment. Referring to FIG. 7, according to an embodiment, when the processor 220 of the electronic device (e.g., the electronic device 101 of FIG. 1 or the electronic device 201 of FIG. 2) transmits power using the first coil 211-1, the magnitude of transmission power may be varied depending on changes in the operating voltage and operating frequency.

For example, when the electronic device 201 wirelessly transmits (710) power using the first coil 211-1 in a state in which the operating voltage is 5V and the operating frequency is fL according to the control of the processor 220, the power having the first characteristic may be received from the external electronic device.

For example, when power is wirelessly transmitted (712) using the first coil 211-1 in a state in which the operating voltage is 5V and the operating frequency is 113 kHz lower than fL (e.g., 120 khz) according to the control of the processor 220, power having the second characteristic (e.g., power of 2.613 mW) larger than the power having the first characteristic may be received from the external electronic device.

Further, when power is wirelessly transmitted (711) using the first coil 211-1 in a state in which the operating voltage is 5V and the operating frequency is 125 khz higher than fL (e.g., 120 khz) according to the control of the processor 220, power having a third characteristic (e.g., power of 2.253 mW) smaller than the power having the first characteristic may be received from the external electronic device. As such, if the operating frequency increases in the electronic device 201, the power transmission gain may increase.

As another example, when the electronic device 201 wirelessly transmits power using the first coil 211-1 in a state in which the operating voltage is 5V and the operating frequency is 113 khz according to the control of the processor 220, 2.613 mW power may be received from the external electronic device. Further, when the electronic device 201 wirelessly transmits power using the first coil 211-1 in a state in which the operating voltage is 9V and the operating frequency is 113 khz according to the control of the processor 220, 6.956 mW power may be received from the external electronic device. As described above, if the operating voltage is increased in the electronic device 201 without adjusting the frequency, the power transmission gain may be increased.

The processor 220 of the electronic device 201 may increase the gain of power transferred to the external electronic device by increasing the operating voltage while reducing the operating frequency upon wireless power transmission, based on the relationship between operating frequency and transmission power and the relationship between operating frequency, operating voltage, and transmission power as described above in connection with FIGS. 5 to 7.

Although the processor 220 of the electronic device 201 is able to increase the transmission power gain (or resonance gain) by adjusting the operating frequency and operating voltage, the resonance gain may be influenced by other parameters (e.g., coupling coefficient k), as well as the operating frequency and/or operating voltage on the power transmission side. According to an embodiment, if the coupling coefficient reduces, the resonance gain may be reduced and, if the coupling coefficient increases, the resonance gain may increase. The coupling coefficient may be influenced by the outer diameter, inner diameter, number of turns, and/or permeability of each of the coil (e.g., transmission coil) of the electronic device 201 and the coil (e.g., reception coil) of the external electronic device. For example, a difference in coil size between the electronic device and the external electronic device may decrease the coupling coefficient (e.g., the coefficient of crossing magnetic lines of force) between the coil of the electronic device 201 and the coil of the external electronic device. A low coupling coefficient due to a difference in size between the coil of the electronic device 201 and the coil of the external electronic device may degrade power transmission efficiency and cause an increase in heat and power consumption. For example, the size of the coil of an accessory device (e.g., smart watch, or Bluetooth earphone) capable of wirelessly receiving power from a mobile phone may be smaller than the size of the coil of the mobile phone. When power is transferred from the coil (e.g., larger coil) of the mobile phone to the coil (e.g., smaller coil) of the accessory device, the coupling coefficient may be decreased due to the difference in coil size, resulting in high leakage inductance and thus degradation of efficiency of power transmission from the mobile phone to the accessory device and an increase in leakage H-field.

Figure 8:
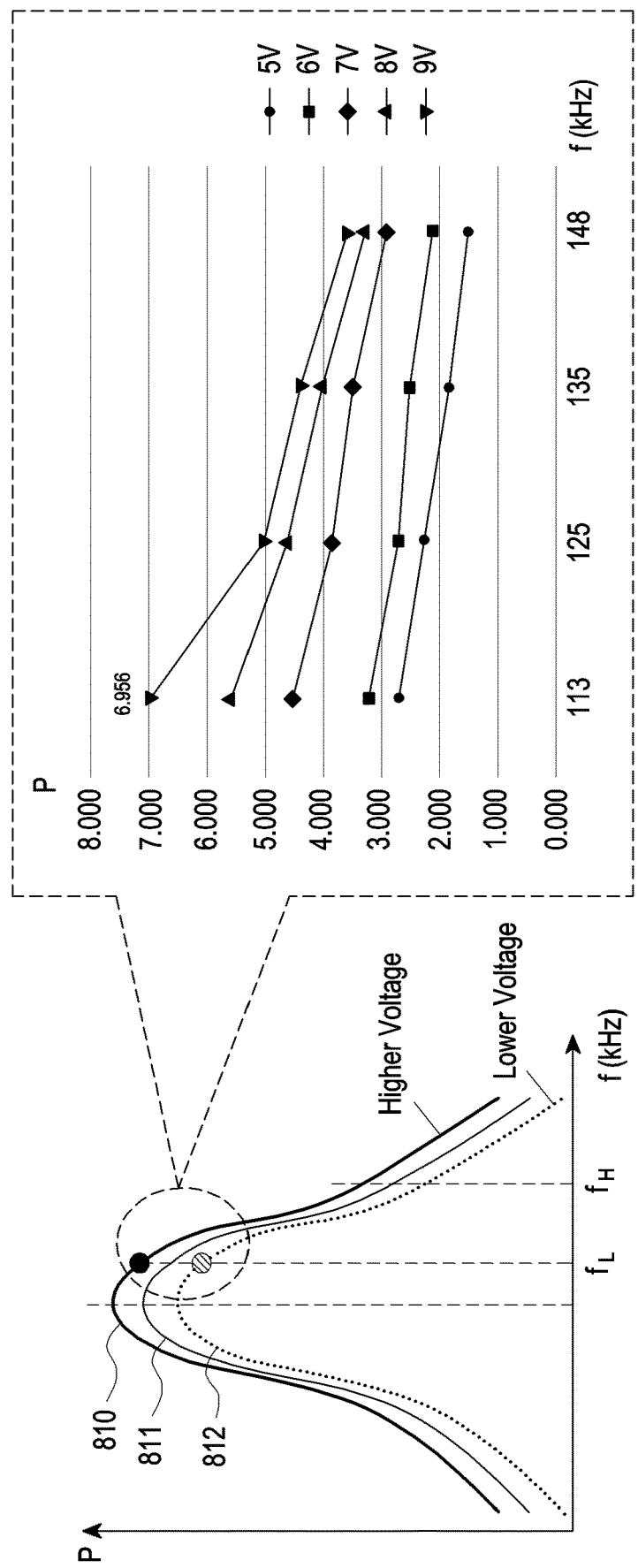
FIG. 8 is a graph illustrating a relationship between the difference in coil size between a coil of an electronic device and a coil of an external electronic device and transmission power, according to an embodiment.

FIG. 8 is a graph illustrating a relationship between the difference in coil size between a coil of an electronic device and a coil of an external electronic device and transmission power, according to an embodiment.

Referring to FIG. 8, according to an embodiment, when wireless power is transmitted from an electronic device (e.g., the electronic device 101 of FIG. 1 or the electronic device 201 of FIG. 2) to an external electronic device, the power P received by the external electronic device may be changed depending on the difference in size between the coil of the electronic device 201 and the coil of the external electronic device, as shown in a fourth power gain curve 810, a fifth power gain curve 811, and a sixth power gain curve 812.

For example, when the difference in size between the coil of the electronic device 201 and the coil of the external electronic device is a first difference (e.g., when the difference in size is smaller than a designated size difference or no or little difference) (e.g., when the electronic device 201 uses the first coil 211-1, and the coil of the external electronic device has a size similar to that of the first coil 211-1 (when it is a small coil not more than a designated size)), the mutual inductance may increase, and thus, the coupling coefficient may increase. As the coupling coefficient increases, the power gain may increase as shown in the fourth power gain curve 810.

For example, when the difference in size between the coil of the electronic device 201 and the coil of the external electronic device is a second difference (which is larger than the first difference and smaller than a third difference), the mutual inductance may be further increased than when it is the first difference, and the coupling coefficient may decrease. As the coupling coefficient decreases, the power gain may be decreased, as compared with the fourth power gain curve 810, as shown in the fifth power gain curve 811.

For example, when the difference in size between the coil of the electronic device 201 and the coil of the external electronic device is the third difference (smaller than the first difference and the second difference) (e.g., when the electronic device 201 uses the first coil 211-1 and the second coil 211-2, and the coil of the external electronic device has a size similar to that of the first coil 211-1 (when it is a coil not more than a designated size difference)), the mutual inductance may decrease further than when it is the second difference, and the coupling coefficient may be further decreased. As the coupling coefficient is further decreased, the power gain may be decreased, as compared with the fifth power gain curve 811, as shown in the sixth power gain curve 812.

The processor 220 of the electronic device 201 may select one of the first coil 211-1 and the first coil 211-1 and second coil 211-2, connected in parallel, as a coil for power transmission of the electronic device 201 based on the relationship between operating frequency and transmission power and the relationship between operating frequency, operating voltage, and transmission power as described above in connection with FIGS. 5 to 7 and the relationship between the difference in size between the coil of the electronic device and the coil of the external electronic device and the transmission power according to FIG. 8 and wirelessly transmit power through the selected coil. For example, if an external electronic device is detected through a ping signal, the processor 220 of the electronic device 201 may identify (or monitor) the operating frequency and/or operating voltage while transmitting power through the first coil 211-1 and, based on a result of the identification, select one of the first coil 211-1 and the first coil 211-1 and second coil 211-2, connected in parallel, as a coil for power transmission and transmit power through the selected coil.

According to certain embodiments, a method for transmitting wireless power based on multiple coils in an electronic device (e.g., the electronic device 101 of FIG. 1 or the electronic device 201 of FIG. 2) may comprise, upon detecting an external electronic device to receive wireless power, transmitting power having the first characteristic to the external electronic device through a first coil (e.g., the first coil 211-1 of FIG. 2) by using a magnetic field control circuit (e.g., the magnetic field control circuit 214 of FIG. 2), and, upon transmitting the power having the first characteristic, maintaining transmission through the first coil based on a first operating frequency and a threshold operating frequency in a designated frequency range, or adjusting an operating voltage based on the first operating frequency and the threshold operating frequency and transmitting power having the second characteristic through the first coil and the second coil (e.g., the second coil 211-2 of FIG. 2) by using the magnetic field control circuit based on a first frequency varied in response to the adjusted operating voltage.

According to certain embodiments, the method may further comprise, when the first operating frequency is greater than or equal to the threshold operating frequency upon transmitting the power having the first characteristic, maintaining the transmission of the power having the first characteristic through the first coil, when the first operating frequency is less than the threshold operating frequency upon transmitting the power having the first characteristic, identifying a variation in the first operating frequency while increasing the operating voltage to a maximum voltage in a designated operating voltage range, when the varied first operating frequency is greater than or equal to the threshold operating frequency, maintaining the transmission of the power having the first characteristic through the first coil, and when the varied first operating frequency is less than the threshold operating frequency, transmitting the power having the second characteristic through the first coil and second coil connected in parallel.

According to certain embodiments, in the method, the first coil may be a circular coil, and the second coil may be a coil surrounding the first coil.

According to certain embodiments, in the method, a first end and a second end of the first coil may be connected with the magnetic field control circuit (e.g., the magnetic field control circuit 214 of FIG. 2) of the electronic device, the first end of the first coil may be connected with a first end of the second coil, a second end of the second coil may be connected with a first end of a switch (e.g., the switch 211-7 of FIG. 2), and a second end of the switch may be connected with the second end of the second coil.

According to certain embodiments, the method may further comprise controlling the switch to switch on to connect the first coil and second coil connected in parallel with the magnetic field control circuit, or controlling the switch to switch off to form an open circuit between the second end of the first coil and the second end of the second coil.

According to certain embodiments, the method may further comprise obtaining information indicating a size of a coil of the external electronic device through a communication module (e.g., the communication module 190 of FIG. 1 or the communication module 290 of FIG. 2) of the electronic device and transmitting the power having the first characteristic through the first coil or transmitting the power having the second characteristic through the first coil and second coil connected based on the information indicating the size of the coil of the external electronic device.

According to certain embodiments, in the method, the designated frequency range may be 100 kHz to 196 kHz or 110 kHz to 148 kHz.

According to certain embodiments, in the method, the designated operating voltage range may be 5V to 9V.

According to certain embodiments, the method may further comprise outputting a ping signal through the first coil and the second coil and identifying the external electronic device based on a response to the ping signal.

Figure 9:
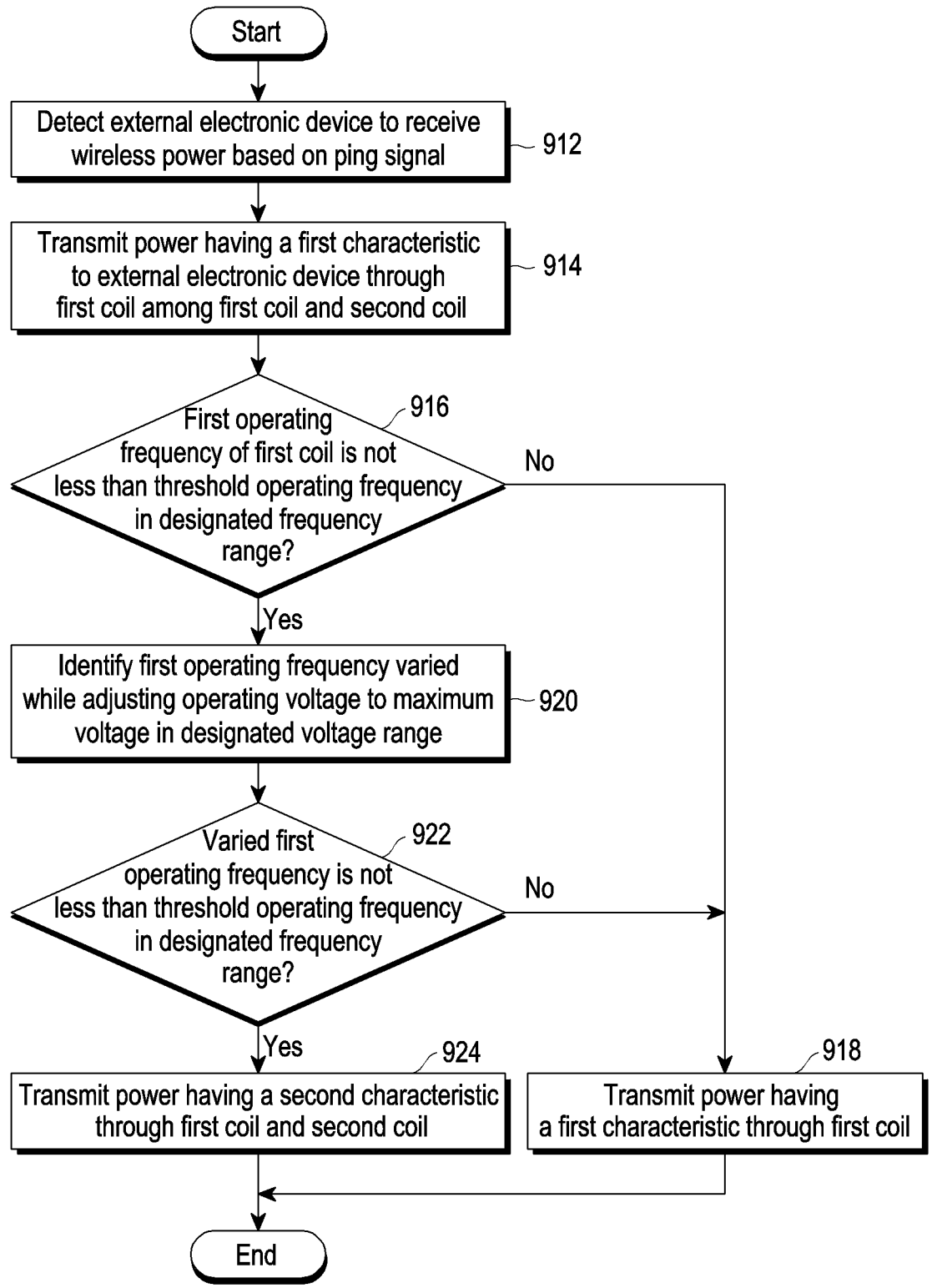
FIG. 9 is a flowchart illustrating a multi-coil-based power transmission method in an electronic device according to an embodiment.

FIG. 9 is a flowchart illustrating a multi-coil-based power transmission method in an electronic device according to an embodiment.

Referring to FIG. 9, according to an embodiment, a processor (e.g., the processor 120 of FIG. 1 or the processor 220 of FIG. 2) of an electronic device (e.g., the electronic device 101 of FIG. 1 or the electronic device 201 of FIG. 2) may perform at least one of operations 912 to 924.

In operation 912, according to an embodiment, the processor 220 may detect an external electronic device to receive power based on a ping signal. According to an embodiment, during the ping operation based on a wireless power transmission request, the processor 220 may control the switch 211-7 to switch on and output a ping signal through the first coil 211-1 and second coil 211-2, connected in parallel, and, as a response corresponding to the ping signal is detected, sense or detect the external electronic device.

In operation 914, according to an embodiment, the processor 220 may transmit power (e.g., power having the first characteristic) through the first coil 211-1. For example, the processor 220 may transmit power (e.g., power having the first characteristic) through the first coil 211-1 in the switch-off state of the switch 211-7 to select a transmission coil of the electronic device (or identify the size of the coil of the external electronic device) when information indicating the size of the coil of the external electronic device is no obtained or regardless of whether information indicating the size of the coil of the external electronic device is obtained.

In operation 916, according to an embodiment, the processor 220 may identify whether the operating frequency (e.g., a first operating frequency) is not less than (or more than) a threshold operating frequency frth in a designated frequency range while transmitting power (e.g., the power having the first characteristic) through the first coil 211-1. For example, the threshold operating frequency frth may be the lowest frequency or a frequency (e.g., within several kHz) (e.g., 120 kHz) closest to the lowest frequency in the designated frequency range (fLkHz to fHkHz) (e.g., 100 kHz to 196 kHz or 110 kHz to 148 kHz). If the operating frequency (e.g., first operating frequency) is not less than (or more than) the threshold operating frequency frth in the designated frequency range, it may be in a state in which the operating frequency may be decreased to increase the power transmission gain.

In operation 918, according to an embodiment, when the first operating frequency is not less than (or more than) the threshold operating frequency frth in the designated frequency range, the processor 220 may control to transmit the power having the first characteristic through the first coil 211-1 (or to maintain transmission of the power having the first characteristic through the first coil 211-1).

In operation 920, unless the first operating frequency is not less than (or more than) the threshold operating frequency frth in the designated frequency range, the processor 220 may identify (or monitor) the first operating frequency varied while adjusting the operating voltage to the maximum voltage in a designated voltage range.

In operation 922, according to an embodiment, the processor 220 may identify whether the varied first operating frequency is not less than (or more than) the threshold operating frequency frth in the designated frequency range. If the varied first operating frequency is more than (or not less than) the threshold operating frequency frth in the designated frequency range, it may be in a state in which the operating frequency may be decreased to increase the power transmission gain.

According to an embodiment, when the varied first operating frequency is not less than (or more than) the threshold operating frequency frth in the designated frequency range, the processor 220 may control to transmit the power having the first characteristic through the first coil 211-1 (or to maintain transmission of the power having the first characteristic through the first coil 211-1) in operation 918.

In operation 924, according to an embodiment, unless the varied first operating frequency is not less than (or more than) the threshold operating frequency frth in the designated frequency range, the processor 220 may transmit power having the second characteristic through the first coil 211-1 and the second coil 211-2. For example, unless the varied first operating frequency is not less than (or more than) the threshold operating frequency frth in the designated frequency range, the processor 220 may switch on the switch 211-7 to increase the power transmission gain and transmit power having the second characteristic through the first coil 211-1 and second coil 211-2, connected in parallel, according to switch on.

As such, the electronic device 201 may identify (or select) a coil with higher power transmission gain based on the operating voltage and operating frequency among multiple coils (e.g., the first coil 211-1 and the second coil 211-2) and transmit power through the identified coil, thus reducing leakage H-field while enabling efficient power transmission.

FIG. 10 is a flowchart illustrating a multi-coil-based power transmission method depending on the presence or absence of external electronic device information in an electronic device according to an embodiment.

Referring to FIG. 10, according to an embodiment, a processor (e.g., the processor 120 of FIG. 1 or the processor 220 of FIG. 2) of an electronic device (e.g., the electronic device 101 of FIG. 1 or the electronic device 201 of FIG. 2) may perform at least one of operations 1012 to 1036.

In operation 1012, according to an embodiment, the processor 220 may initiate (or start) a wireless power transmission process according to a wireless power transmission request (wireless power transfer start).

In operation 1014, according to an embodiment, the processor 220 may detect an external electronic device to receive wireless power based on a ping signal as the wireless power transmission process is initiated (Ping status, Vop=Vinit, SW–H). For example, the processor 220 may enter a ping status and control the switch 211-7 to switch on (SW–H (to output a high signal to the switch)) in a state in which the operating voltage Vop is set to a designated initial value Vinut, so that the first coil 211-1 and the second coil 211-2 are connected in parallel, and the ping signal is output through the first coil 211-1 and second coil 211-2, connected in parallel. The processor 220 may sense or detect an external electronic device as a response corresponding to the ping signal is detected.

In operation 1016, according to an embodiment, the processor 220 may perform the authentication operation in the state in which the external electronic device is detected (Rx recognition). The processor 220 may receive, through communication, information necessary for receiving power by the external electronic device and information for identifying the external electronic device in the authentication operation. For example, the information for identifying the external electronic device may include the ID of the external electronic device and/or information indicating the size of the coil (or reception coil) of the external electronic device.

In operation 1018, according to an embodiment, the processor 220 may identify whether information indicating the size of the coil (or reception coil) of the external electronic device is obtained (unknown Rx). For example, the processor 220 may store the external electronic device ID and the coil size information in the memory and obtain coil size information about the external electronic device from the memory using the external electronic device ID. Or, the processor 220 may obtain coil size information about the external electronic device from an external server using the external electronic device ID. According to an embodiment, when the information indicating the size of the coil of the external electronic device is obtained, the processor 220 may proceed to operation 1020 and, unless the information indicating the size of the coil of the external electronic device is obtained (or when it is impossible to obtain the information indicating the size of the coil of the external electronic device), the processor 220 may proceed to operation 1022. The processor 220 may perform an operation for selecting a transmission coil of the electronic device (or identifying the coil size of the external electronic device) regardless of whether the information indicating the size of the coil of the external electronic device is obtained.

In operation 1020, according to an embodiment, when the information indicating the size of the coil of the external electronic device is obtained, the processor 220 may perform wireless power transmission using the information indicating the size of the coil of the external electronic device according to a designated process (Do pre-defined process). For example, according to an embodiment, the processor 220 may identify whether to use the first coil 211-1 or the first coil 211-1 and second coil 211-2, connected in parallel, using the information indicating the size of the coil of the external electronic device. For example, when the first coil 211-1 is used, the processor 220 may control the switch 211-7 to switch off and thus transmit power having the first characteristic through the first coil 211-1. When the first coil 211-1 and second coil 211-2, connected in parallel, are used, the processor 220 may control the switch 211-7 to switch on and transmit power having the second characteristic through the first coil 211-1 and second coil 211-2, connected in parallel.

In operation 1022, according to an embodiment, when information indicating the size of the coil of the external electronic device is not obtained (or when it is impossible to obtain information indicating the size of the coil of the external electronic device), the processor 220 may transmit power (e.g., power having the first characteristic) through the first coil 211-1 (switch turn off, Vop=Vinit, SW–L). For example, the processor 220 may control the switch 211-7 to switch off (switch turn off) (SW–L (to output a low signal to the switch)) in a state in which the operating voltage Vop is set to a designated initial value Vinut and transmit the power having the first characteristic through the first coil 211-1.

In operation 1024, according to an embodiment, the processor 220 may identify whether the operating frequency (e.g., a first operating frequency or frop) is more than (or not less than) a threshold operating frequency frth in a designated frequency range while transmitting power (e.g., the power having the first characteristic) through the first coil 211-1 (frop>frth). For example, the threshold operating frequency frth may be the lowest frequency or a frequency (e.g., within several kHz) closest to the lowest frequency in the designated frequency range (fLkHz to fHkHz) (e.g., 100 kHz to 196 kHz or 110 kHz to 148 kHz). If the first operating frequency is higher than the threshold operating frequency frth in the designated frequency range, it may be in a state in which the operating frequency may be decreased to increase the power transmission gain.

In operation 1026, according to an embodiment, when the first operating frequency is more than (or not less than) the threshold operating frequency frth in the designated frequency range, the processor 220 may control to transmit the power having the first characteristic through the first coil 211-1 (or to maintain transmission of the power having the first characteristic through the first coil 211-1) (RX:small coil, Vop=Current Vop, SW–L).

In operation 1028, unless the first operating frequency is more than (or not less than) the threshold operating frequency frth in the designated frequency range, the processor 220 may increase the operating voltage Vop by a designated voltage value ΔV within the maximum voltage in a designated voltage range (Vop=Vop+ΔV).

In operation 1030, according to an embodiment, the processor 220 may identify whether the first operating frequency frop, varied after increasing the voltage, is more than (or not less than) the threshold operating frequency frth in the designated frequency range (frop>frth). If the varied first operating frequency is more than (or not less than) the threshold operating frequency frth in the designated frequency range, it may be in a state in which the operating frequency may be decreased to increase the power transmission gain.

In operation 1032, according to an embodiment, unless the varied first operating frequency frop is more than (or not less than) the threshold operating frequency frth in the designated frequency range, the processor 220 may control to transmit the power having the first characteristic through the first coil 211-1 (or to maintain transmission of the power having the first characteristic through the first coil 211-1) (RX:small coil, Vop=Current Vop, SW–L).

In operation 1034, according to an embodiment, if the varied first operating frequency frop is more than (or not less than) the threshold operating frequency frth in the designated frequency range, the processor 220 may identify whether the operating voltage after increasing the voltage is the maximum voltage Vmax in the designated voltage range (Vop=Vmax). According to an embodiment, unless the operating voltage after increasing the voltage is the maximum voltage Vmax in the designated voltage range, the processor 220 may return to operation 1028. According to an embodiment, if the operating voltage after increasing the voltage is the maximum voltage Vmax in the designated voltage range, the processor 220 may perform operation 1036.

In operation 1036, according to an embodiment, the processor 220 may switch on the switch 211-7 and transmit power having the second characteristic through the first coil 211-1 and second coil 211-2 (large coil), connected in parallel according to switch on. For example, the processor 220 may adjust the operating voltage Vop to a value (7.5V) required by the external electronic device, control the switch 211-7 to switch on (SW–H (to output a high signal to the switch)), and transmit power having the second characteristic through the first coil 211-1 and second coil 211-2 (large coil), connected in parallel (RX:large coil, Vop=7.5V, SW–H).

FIG. 11 is a view illustrating an example of enhancing power transmission efficiency when wireless power is transmitted from an electronic device to an external electronic device according to an embodiment.

Referring to FIG. 11, according to an embodiment, when an electronic device (e.g., the electronic device 101 of FIG. 1 or the electronic device 201 of FIG. 2) wirelessly transmits power to an external electronic device, the power transmission efficiency according to distance may be measured. The horizontal axis may denote the distance between the electronic device 201 and the external electronic device, and the vertical axis may denote the power transmission efficiency between the electronic device 201 and the external electronic device.

When the coil (e.g., reception coil) of the external electronic device (e.g., a smart watch) is a small coil (e.g., a coil smaller than the first coil 211-1 and the second coil 211-2 of the electronic device 201), the efficiency (default) when the processor of the electronic device 201 transmits wireless power to the external electronic device through the first coil 211-1 and second coil 211-2, connected in parallel, in a state in which the switch 211-7 is on may be better than the efficiency (proposed scheme) when the processor of the electronic device 201 switches off the switch 211-7 and transmits wireless power to the external electronic device through the first coil 211-1.

When power is wirelessly transmitted to the external electronic device, the H-field may be measured according to the distance. Table 1 below is a table showing an example of enhancing H-field when wireless power is transmitted from an electronic device to an external electronic device according to an embodiment.

TABLE 1

|  |  | H-field (A/m) (measured value) | |
|---|---|---|---|
|  | distance | Misalign(0.1135 kHz) | align(0.1480 kHz) |
| Default | 0 mm | 13.593 | 7.4167 |
|  | 15 mm | 9.312 | 6.3570 |
| Proposed scheme | 0 mm | 3.6113 | 1.2567 |
|  | 15 mm | 3.5663 | 1.1153 |

Referring to Table 1, according to an embodiment, in a case where the coil (e.g., reception coil) of the external electronic device (e.g., a smart watch) is a small coil (e.g., a coil smaller than the first coil 211-1 and the second coil 211-2 of the electronic device 201), the H-field leakage value (proposed scheme) when the processor of the electronic device 201 switches off the switch 211-7 and transmit wireless power to the external electronic device through the first coil 211-1 may be smaller than the H-field leakage value (default) when the processor of the electronic device 201 transmits wireless power to the external electronic device through the first coil 211-1 and second coil 211-2, connected in parallel, in a state in which the switch 211-7 is on. For example, in the standard, the H-field leakage value is limited to 4.93. The H-field leakage value when the processor of the electronic device 201 switches off the switch 211-7 and transmits wireless power to the external electronic device through the first coil 211-1 may meet the limitation according to the standard.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments, there may be provided a non-transitory storage medium storing instructions configured to be executed by at least one processor of an electronic device to enable the electronic device to perform at least one operation. The at least one operation may comprise, upon detecting an external electronic device to receive wireless power, transmitting power having the first characteristic to the external electronic device through a first coil by using a magnetic field control circuit and, upon transmitting the power having the first characteristic, maintaining first transmission through the first coil based on a first operating frequency and a threshold operating frequency in a designated frequency range, or upon transmitting the power having the first characteristic, adjusting an operating voltage based on the first operating frequency and the threshold operating frequency and transmitting power having the second characteristic through the first coil and the second coil by using the magnetic field control circuit based on a first frequency varied in response to the adjusted operating voltage.

The embodiments herein are provided merely for better understanding of the disclosure, and the disclosure should not be limited thereto or thereby. It should be appreciated by one of ordinary skill in the art that various changes in form or detail may be made to the embodiments without departing from the scope of this disclosure as defined by the following claims, and equivalents thereof.

What is claimed is:

1. An electronic device comprising:
a battery;
a multi-coil circuit including a first coil and a second coil;
a magnetic field control circuit electrically connected with the multi-coil circuit;
a power management module electrically connected with the battery and the magnetic field control circuit; and
a processor electrically connected with the multi-coil circuit, the magnetic field control circuit, and the power management module,
wherein the processor is configured to:
upon detecting an external electronic device to receive wireless power, control the magnetic field control circuit to transmit power having a first characteristic to the external electronic device through the first coil, and
upon transmitting the power having the first characteristic, control the magnetic field control circuit to maintain transmission through the first coil based on a first operating frequency and a threshold operating frequency in a designated frequency range, or
upon transmitting the power having the first characteristic, adjust an operating voltage based on the first operating frequency and the threshold operating frequency and control the magnetic field control circuit to transmit power having a second characteristic through the first coil and the second coil based on a first frequency varied in response to the adjusted operating voltage.

2. The electronic device of claim 1, wherein the processor is further configured to:
when the first operating frequency is greater than or equal to the threshold operating frequency upon transmitting the power having the first characteristic, control the magnetic field control circuit to maintain the transmission of the power having the first characteristic through the first coil,
when the first operating frequency is less than the threshold operating frequency upon transmitting the power having the first characteristic, identify a variation in the first operating frequency while increasing the operating voltage to a maximum voltage in a designated operating voltage range,
when the varied first operating frequency is greater than or equal to the threshold operating frequency, control the magnetic field control circuit to maintain the transmission of the power having the first characteristic through the first coil, and
when the varied first operating frequency is less than the threshold operating frequency, control the magnetic field control circuit to transmit the power having the second characteristic through the first coil and the second coil connected in parallel.

3. The electronic device of claim 1, wherein the first coil is a circular coil, and the second coil is a coil surrounding the first coil.

4. The electronic device of claim 2,
wherein a first end and a second end of the first coil are connected with the magnetic field control circuit, and the first end of the first coil is connected with the second coil,
wherein a first end of the second coil is connected with the first end of the first coil, and a second end of the second coil is connected with a first end of a switch, and
wherein a second end of the switch is connected with the second end of the first coil.

5. The electronic device of claim 4, wherein the processor is configured to:
control the switch to switch on to connect the first coil and the second coil in parallel with the magnetic field control circuit, or
control the switch to switch off to form an open circuit between the second end of the first coil and the second end of the second coil.

6. The electronic device of claim 1, further comprising a communication module, and
wherein the processor is further configured to:
obtain information indicating a size of a coil of the external electronic device through the communication module, and
control the magnetic field control circuit to transmit the power having the first characteristic through the first coil or transmit the power having the second characteristic through the first coil and the second coil connected in parallel, based on the information indicating the size of the coil of the external electronic device.

7. The electronic device of claim 1, wherein the designated frequency range is 100 kHz to 196 kHz or 110 kHz to 148 kHz.

8. The electronic device of claim 2, wherein the designated operating voltage range is 5V to 9V.

9. The electronic device of claim 1, wherein the processor is further configured to output a ping signal through the first coil and the second coil and identify external electronic device based on a response to the ping signal.

10. A method for transmitting wireless power based on multiple coils in an electronic device, the method comprising:
upon detecting an external electronic device to receive wireless power, transmitting power having a first characteristic to the external electronic device through a first coil by using a magnetic field control circuit; and
upon transmitting the power having the first characteristic, maintaining transmission through the first coil based on a first operating frequency and a threshold operating frequency in a designated frequency range, or adjusting an operating voltage based on the first operating frequency and the threshold operating frequency and transmitting power having a second characteristic through the first coil and the second coil by using the magnetic field control circuit based on a first frequency varied in response to the adjusted operating voltage.

* * * * *